United States Patent [19]
Amin et al.

[11] Patent Number: 5,742,995
[45] Date of Patent: Apr. 28, 1998

[54] METHOD TO PREDICT AN ACCURATE MR SENSOR DIMENSION WHEN VIEWED FROM ABS

[75] Inventors: Nurul Amin, Burnsville; Lance E. Stover, Eden Prairie; Richard P. Larson, Brooklyn Park; Gregory S. Mowry, Burnsville, all of Minn.

[73] Assignee: Seagate Technology, Inc., Scotts Valley, Calif.

[21] Appl. No.: 653,617

[22] Filed: May 24, 1996

[51] Int. Cl.⁶ ........................................... G11B 5/42
[52] U.S. Cl. ...................... 29/603.1; 360/113; 451/6
[58] Field of Search ........................ 29/603.1, 603.9, 29/593; 360/113; 451/5, 6

[56] References Cited

U.S. PATENT DOCUMENTS

| | | |
|---|---|---|
| 4,218,650 | 8/1980 | Matzen .................................. 324/62 |
| 4,457,114 | 7/1984 | Hennenfent et al. ................. 51/216 R |
| 4,477,968 | 10/1984 | Kracke et al. ......................... 29/603 |
| 4,536,992 | 8/1985 | Hennenfent et al. ................. 51/109 R |
| 4,689,877 | 9/1987 | Church ................................... 29/603 |
| 4,841,625 | 6/1989 | Valstyn ................................... 29/603 |
| 4,861,398 | 8/1989 | Fukuoka et al. ....................... 156/64 |
| 4,914,868 | 4/1990 | Church et al. ...................... 51/165.71 |
| 5,065,483 | 11/1991 | Zammit ................................. 29/603 |
| 5,210,667 | 5/1993 | Zammit ............................... 360/113 |
| 5,361,547 | 11/1994 | Church et al. .......................... 451/5 |

*Primary Examiner*—Carl E. Hall
*Attorney, Agent, or Firm*—Kinney & Lange, P.A.

[57] ABSTRACT

A system and method of determining a height of a sensor is disclosed. The sensor has an air bearing surface. The method includes determining a pre-processing width of a base of a first triangle, a top of a second triangle and a first and a second rectangle, all formed of the same material which forms the sensor. The air bearing surface of the magnetoresistive sensor, the base of the first triangle, the top of the second triangle and the first and second rectangles are then processed and simultaneously lapped. A post-lapping width of the base of the first triangle, the top of the second triangle and the first and second rectangles are then determined. The height of the sensor is then calculated through use of the pre-processing and post-lapping widths at the air bearing surfaces of the bases of the first triangle, the top of the second triangle and the first and second rectangles.

17 Claims, 5 Drawing Sheets

METHOD TO PREDICT AN ACCURATE MR SENSOR DIMENSION WHEN VIEWED FROM ABS

BACKGROUND OF THE INVENTION

The present invention relates generally to the fabrication of magnetoresistive sensors or transducers for data storage applications, and more particularly to a non-destructive analysis of magnetoresistive sensor dimensions as viewed from an air bearing surface to ensure that a desired magnetoresistive sensor height has been achieved.

Conventional lap monitors for inductive thin film heads are typically used to lap a bar of inductive heads to a final height. These conventional monitors typically utilize pole metalizations and polymers to form an analog-digital system for end point lap detection. The metalizations are common to the thin film inductive head write structures. However, with sliders having a magnetoresistive (MR) sensor design positioned on the surface of the slider to read information from a disc, the situation is much more complicated since the head is a combined MR read, inductive thin film write device. For proper MR reading, it is essential to control the end point lap detection of the slider surface bearing the MR sensor by using features common to the MR sensor. The end point lap detection determines the final height of both the slider rail and the MR sensor. Since inductive thin film lap monitors utilize resistors having features common to inductive thin film writers, end point lap detection control of the slider and its MR sensor is degraded if writer base lap monitor resistors are used.

Sliders having MR sensors are used in magnetic storage systems to detect magnetically encoded information from a storage medium, i.e. to read information from a disc. A time dependent magnetic field from the magnetic storage medium or disc directly modulates the resistivity of the MR sensor. In particular, changing magnetic fields originating from the magnetic storage medium rotate the magnetization of the MR sensor and thereby change the resistance of the sensor. This phenomenon is called the MR effect. The change in resistance of the MR sensor can be detected either by passing a sense current through the MR sensor and measuring the voltage across the MR sensor, or by passing a voltage across the MR sensor and measuring the current through the MR sensor. The resulting signal can be used to recover information from the magnetic storage medium.

During the fabrication of magnetic heads for use in magnetic data storage applications, an array of sensors and auxiliary circuits are fabricated on a common substrate in a deposition of metallic and non-metallic layers. In most fabrications, there is an auxiliary circuit for each sensor. Patterning the array of sensors and auxiliary circuits is accomplished using photolithography in combination with etching and lift-off processes. The finished array or wafer is then optically and electrically inspected and subsequently cut into small arrays, rows or bars. Next, individual bars of sensors and auxiliary circuit are machined at a surface which will eventually become the air bearing surface of the sensor until the auxiliary circuit indicates that a desired MR sensor height has been obtained.

During machining of a particular row of sensors and auxiliary circuits, the air bearing surface moves from a beginning position to a final position, while reducing the height of the sensors. The primary function of the auxiliary circuits is to stop the machining process once the auxiliary circuit indicates that the desired sensor height has been achieved. After a particular row of sensors is machined, the row can be cut or diced into individual sliders. During this process, the auxiliary circuits can be destroyed if desired. U.S. Pat. No. 5,463,805 entitled "Method of Lapping MR Sensors" discloses one type of an auxiliary circuit for estimating the proper sensor height. This patent discloses an auxiliary circuit which utilizes a reference resistor, a target resistor and a variable resistor. The resistors are formed from MR material.

There are numerous difficulties associated with conventional MR auxiliary circuit designs. One common problem with these circuits is that they do not precisely account for errors introduced by the existence of mask or contact edge movement during wafer processing steps. The edge movement phenomena caused by wafer processing results in the magnetoresistive resistors of the auxiliary circuit being reduced or expanded in size as surfaces or edges of these elements move by an undetermined quantity. Thus, the actual lengths and heights of these elements will frequently be different then the intended length and heights (i.e., the mask lengths and heights). The dimension changes in the sensor and in the resistors of the auxiliary circuit introduce errors in the machining process. For example, if the resistance of a reference resistor in an auxiliary circuit is dimensionally changed by edge movement, comparison of its resistance to the resistance of a target or variable resistor of the sensor will result in the machining process being halted at the wrong time which would produce a row of sensors having an undesired height.

A second common problem associated with conventional MR auxiliary circuit designs is due to the lapping of an entire bar of sensors at one time. If the row of sensors is not coplanar with the lapping or machining device, each particular sensor of the row of sensors will be machined or lapped to a different sensor height. Thus, the entire row of sensors could have an improper height, and thus would not correspond to necessary tolerances.

Thus, there is a need for an additional system which can be utilized to verify whether a proper sensor height has been obtained once the MR sensor and auxiliary circuit have been lapped. However, it is important that the measurement is preformed without destroying the sensor.

SUMMARY OF THE INVENTION

The present invention is a system and method for determining a height of a sensor. In one embodiment, a magnetic sensor is formed from a magnetoresistive material and has an air bearing surface which is to be lapped until indicators indicate that a desired magnetic sensor height has been obtained. The method includes determining a pre-wafer processing width of several features of an auxiliary test feature including a base of a first triangle, a top of a second triangle and a first and a second rectangle at the air bearing surface. The first triangle, second triangle, first rectangle and second rectangle are fabricated from the same magnetoresistive material as that which forms the magnetic sensor and are fabricated at the same time as fabrication of the magnetic sensor. After various wafer processing steps, the air bearing surface of the magnetoresistive sensor, the base of the first triangle, the top of the second triangle and the first and second rectangles are then simultaneously lapped until an additional portion of the auxiliary test feature estimates that a desired magnetic sensor height is achieved. A post-wafer processing width at the air bearing surface of the base of the first triangle, a post-wafer processing width of the top of the second triangle and a post-wafer processing width of the first and second rectangles are then determined. The exact height of the magnetic sensor is calculated through use of the pre-wafer processing and post-wafer processing widths at the air bearing surfaces of the base of the first triangle, the top of the second triangle and the first and second rectangles.

Calculating the final height of the magnetic sensor after wafer processing and lapping includes numerous steps. Calculation of the sensor height involves making measurements of the features (the magnetic sensor and the auxiliary test feature) from the air bearing surface, using the appropriate formulas derived for the sensor device and numerically calculating the sensor height. The formulas consist of expressions relating to the pre-fabricated dimensions, the amount of shrinkage during wafer processing and the final sensor height to the dimensions measured from the air bearing surface.

DETAILED DESCRIPTION OF THE PREFERRED EMBODIMENTS

The system and method of the present invention are discussed below with reference to examples in which a height of a magnetic sensor is determined. However, it will be clear to those of ordinary skill in the art that the system and method of the present invention can be used to determine whether an accurate throat height of an inductive transducer has been achieved.

Prior MR sensor systems include multiple sensors which are simultaneously processed and lapped. Each sensor has an auxiliary test feature which includes circuitry to stop the processing once the auxiliary test feature indicates that the desired MR sensor height has been achieved. However, in the past, to verify that the proper MR sensor height of a particular slider has indeed been achieved, the MR sensor would have to undergo destructive analysis so that the exact MR sensor height could be measured. Thus, the present invention provides a system and method for measuring the exact post processing and lapping MR sensor height of any particular MR sensor without the use of a destructive analysis.

Figure 1:
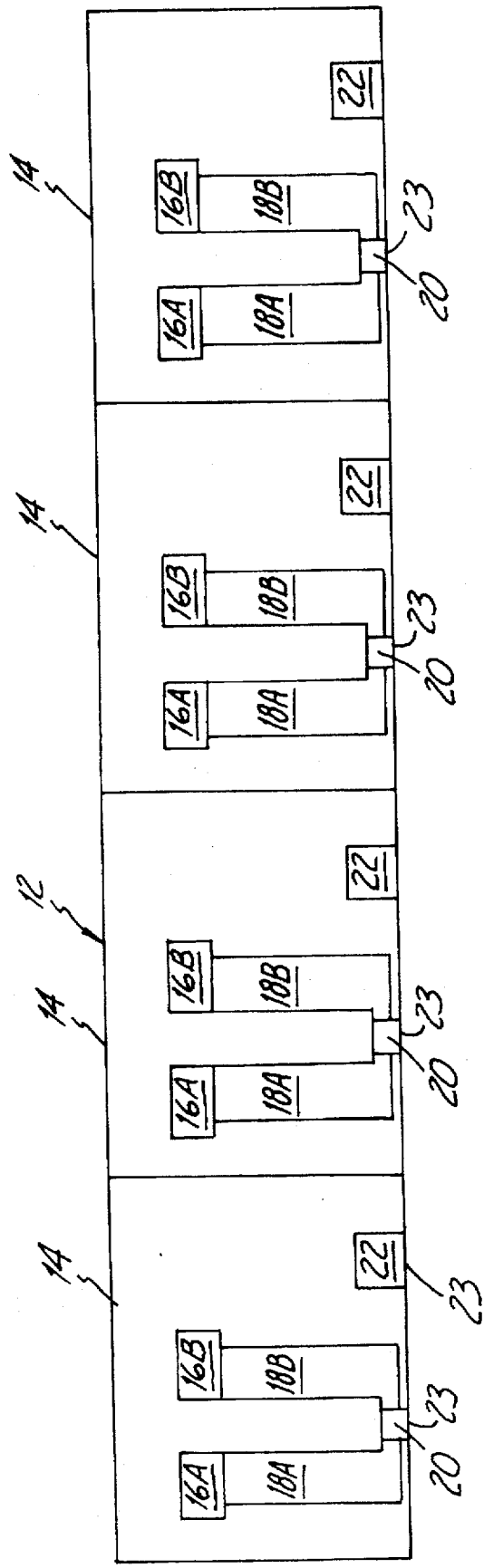
FIG. 1 is a diagrammatic view showing a single bar of a wafer map which includes MR sensors and auxiliary test features.

The process of fabricating an MR sensor begins with an MR wafer. A wafer can consist of any number of rows (sometimes called bars) and/or columns of sensors and auxiliary test circuits. FIG. 1 is a diagrammatic view showing a single bar of a wafer. Bar 12 includes multiple identical units 14. A wafer can vary in size from as few as 1 unit to as many 100,000 units or more. Each unit 14 includes pads 16a and 16b, electrical contacts 18a and 18b, MR sensor 20 and auxiliary test feature 22.

For an MR sensor, similar to MR sensor 20, to be fabricated such that it can be incorporated into a slider and precisely detect signals from a magnetic storage medium or disc during a read operation, the geometrical dimensions of both the slider and the MR sensors, especially the height of the MR sensor, must be precise.

In order to accurately develop the plurality of sliders from an MR wafer, the wafer must first be sliced into a plurality of bars such as bar 12. As can be seen in FIG. 1, MR sensor 20 and auxiliary test feature 22 each have a surface adjacent to surface 23 which lies in plane 25 of bar 12.

MR sensors 20 and auxiliary test features 22 are deposited in layers formed on a substrate. Although illustrated diagrammatically as being two-dimensional in FIG. 1, the MR sensors and auxiliary test features are multi-layer devices having a finite thickness and are covered with an overcoat layer (not shown). MR sensor 20 and auxiliary circuits 22 undergo a variety of wafer processing steps to properly fabricate MR sensor 20.

Figure 2:
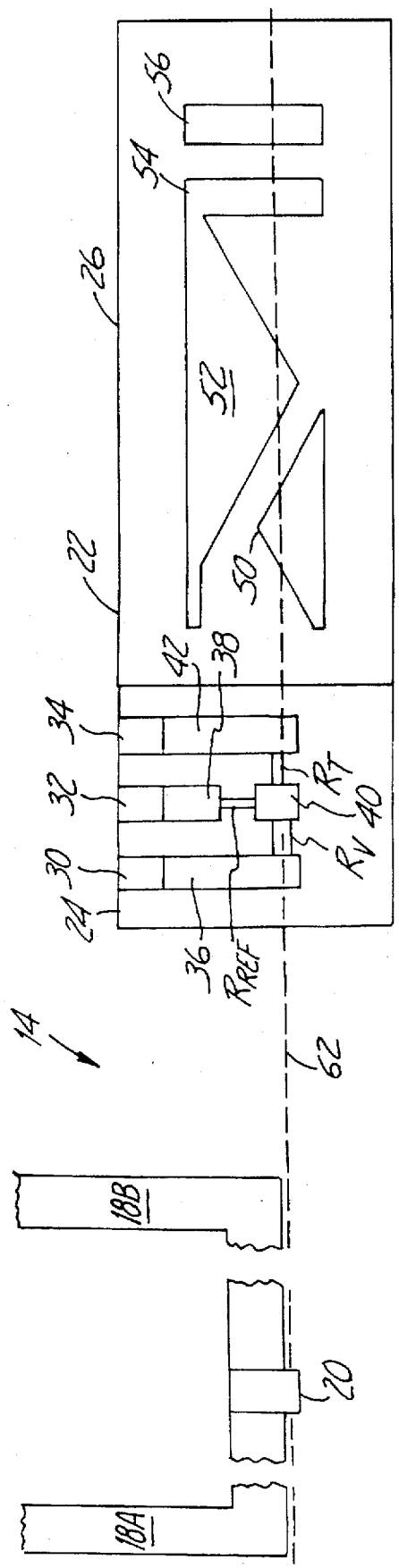
FIG. 2 is an exploded view of one unit of a wafer map which includes the MR sensor and the auxiliary test feature.

FIG. 2 is an exploded view showing a single unit 14 of bar 12 which includes MR sensor 20, electrical contacts 18 and auxiliary test feature 22. As shown in FIG. 2, auxiliary test feature 22 has two distinct portions: end point lap detection portion 24 and MR sensor height verification portion 26.

End point lap detection portion 24 further includes a system for lapping MR sensor 20 to an estimated sensor height. End point lap detection portion 24, which is essentially a lap monitor, includes variable resistor $R_v$, target resistor $R_t$, reference resistor $R_{ref}$, bond pads 30, 32 and 34, and contacts 36, 38, 40 and 42.

End point lap detection portion 24 is shown and described in greater detail in U.S. Pat. No. 5,463,805 entitled "Method of Lapping MR Sensors", which is hereby incorporated by reference. However, it is understood that the system and method shown in U.S. Pat. No. 5,463,805 is only one system and method for processing MR sensors to an expected height, and those skilled in the art will understand that other systems and methods for processing MR sensors to an expected height could equally be used.

Figure 3:
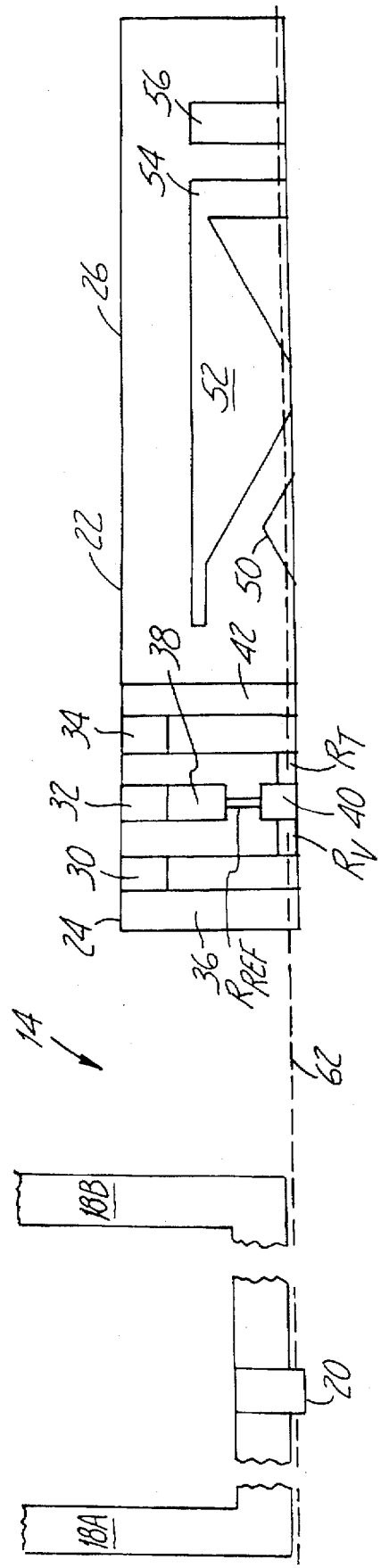
FIG. 3 is a second exploded view of one unit of a wafer map which includes the MR sensor and the auxiliary test feature.

MR sensor height verification portion 26 shown in FIG. 2 differs from MR sensor height verification portion 26 in FIG. 3 in that verification portion 26 of FIG. 2 shows the entire verification portion, while verification portion 26 of FIG. 3 includes only a top section of verification portion 26. Verification portion 26 shown in FIG. 3 accurately shows this portion as it would be part of unit 14 of bar 12. However, verification portion 26 shown in FIG. 2 is shown to accurately describe how verification portion 26 properly works in conjunction with this disclosure.

As shown in FIGS. 2 and 3, MR sensor height verification portion 26 includes first triangle 50, second triangle 52, first rectangle 54 and second rectangle 56. In fabricating MR sensor height verification portion 26, first triangle 50, second triangle 52, first rectangle 54 and second rectangle 56 would all be fabricated from the same magnetoresistive material and in the same or similar manner as MR sensor 20 and would undergo the same wafer processing steps as MR sensor 20.

Figure 4:
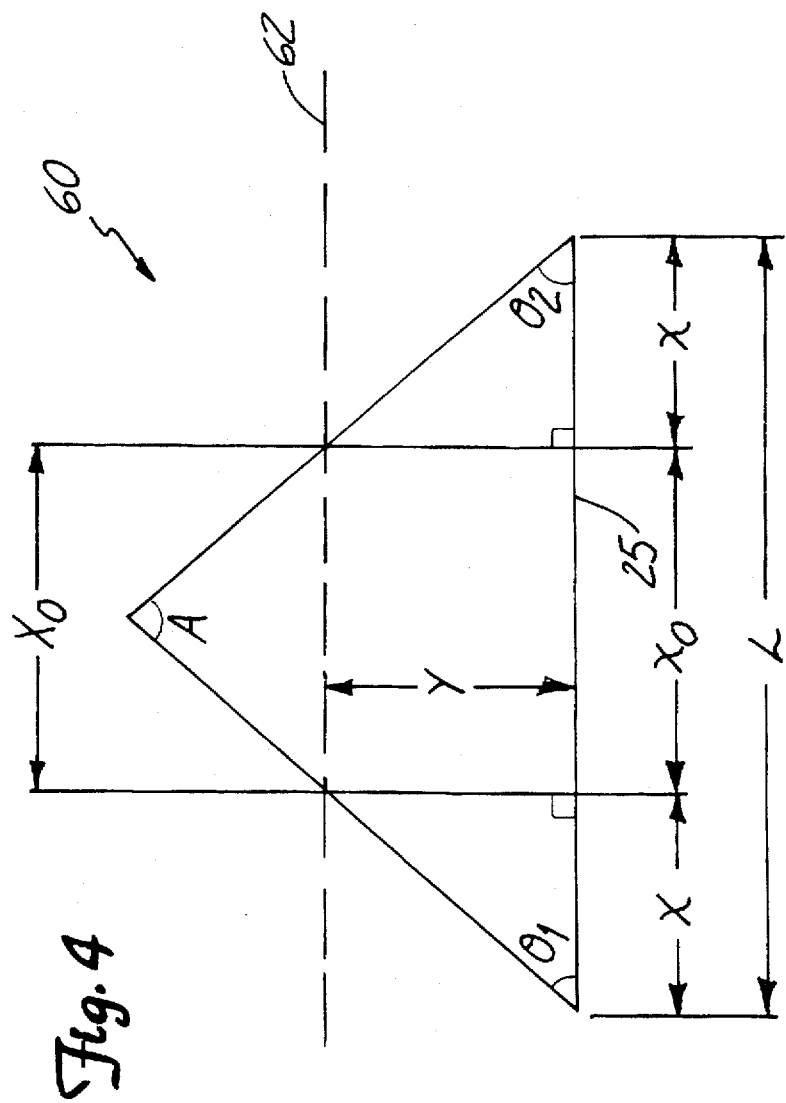
FIG. 4 is a diagrammatic view of a triangle illustrating underlying principles of the present invention.

FIG. 4 shows triangle 60 which will be used in the discussion of the underlying principals of the present invention. Angles A, $\theta_1$ and $\theta_2$ are predetermined and known angles; as are lengths of the edges of triangle 60 connecting angles A, $\theta_1$ and $\theta_2$. As illustrated in FIG. 4, $\theta_1$ is equal to $\theta_2$ and is simply represented $\theta$ in the following equations. However, it is understood that $\theta_1$ and $\theta_2$ could independently be any angle.

In order to determine the height Y, which will correspond to the sensor height of MR sensor 20 as later described, the equation for the length L must first be determined as follows:

$$L = X_0 + 2X. \quad (1)$$

However, since $X = Y/\tan\theta$, the sensor height Y and the exposed length L at the air bearing surface lying in plane 25 are related by the following equation:

$$L = X_0 + \frac{2Y}{\tan\theta}. \quad (2)$$

Assuming that the bottom surface of triangle 60 is being lapped upward to lap line 62, corresponding to an MR sensor lapping process, the change in length L is determined by:

$$\Delta L = 2 * \frac{\Delta Y}{\tan\theta}. \quad (3)$$

Since angle $\theta$ is a known angle, and since the change in length $\Delta L$ is a known length, the change in Y can be solved for by the following equation:

$$\Delta Y = \Delta L * 2\tan\theta. \quad (4)$$

Finally, the following equation is used to determine height Y which corresponds to the actual height of MR sensor 20:

$$Y_{final} = Y_{start} - \Delta Y. \quad (5)$$

The above equations disclose the underlying principals which are necessary to accurately verify the height of an MR sensor. As shown in the above equations, a small change in the height Y of the triangle, which corresponds to the height of the MR sensor, produces a large change in the length L. For example, if $\theta$ equals 70°, then:

$$\Delta L = 5.5 \Delta Y. \quad (6)$$

During the processing of MR sensor 20, where MR sensor 20 is lapped from a beginning height to an estimated final height, the height of MR sensor 20 is reduced or shrunk due to various processing steps. This reduction must be accounted for in determining the final MR sensor height to get an accurate sensor height. Without factoring in this reduction of the height of MR sensor during the processing, the height of MR sensor 20 cannot be accurately determined.

Figure 5:
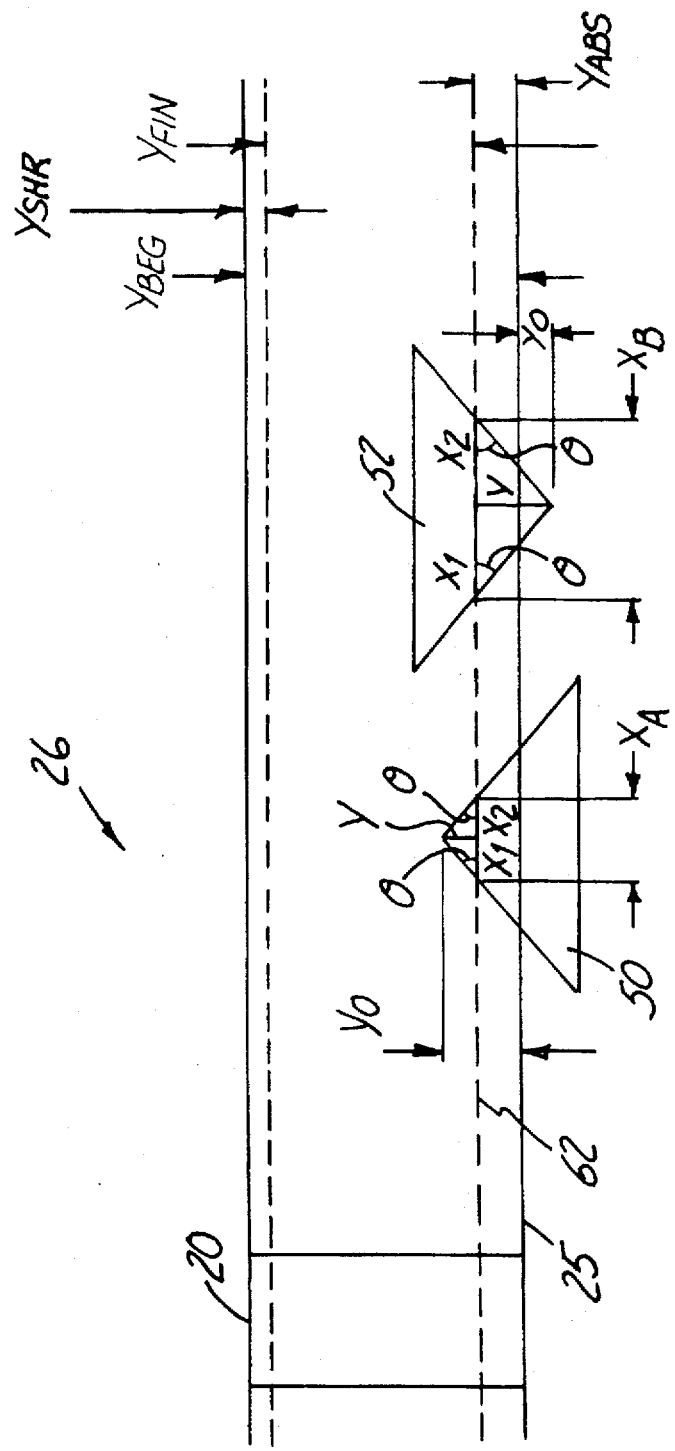
FIG. 5 is a detailed view showing a single MR sensor and a portion of the auxiliary test feature including two triangles of the present invention.

FIG. 5 is a detailed view showing MR sensor 20 prior to wafer fabrication or processing and MR sensor height verification portion 26 of auxiliary test feature 22. As shown in FIG. 5, $Y_{BEG}$ is the predetermined height of MR sensor 20 prior to processing, $Y_{FIN}$ equals the finished height of MR sensor 20 after processing, $Y_{SHR}$ equals the amount of reduction or shrinkage from the top of MR sensor 20 during the wafer fabrication, and $Y_{ABS}$ is the distance from plane 25 to lap line 62 as measured from triangles 50 and 52. $Y_{ABS}$ incorporates the amount MR sensor 20 is lapped along with the amount of reduction or shrinkage at the bottom of MR sensor 20. Thus, the final height of MR sensor 20 can be determined by the following equations:

$$Y_{BEG} = Y_{SHR} + Y_{FIN} + Y_{ABS} \quad (7)$$

and $$Y_{FIN} = Y_{BEG} - Y_{SHR} - Y_{ABS} \quad (8)$$

wherein the beginning height $Y_{BEG}$ of MR sensor 20 is a known or predetermined height.

The following is a discussion of the steps necessary to determine two unknown quantities; specifically the amount of shrinkage $Y_{SHR}$ at the top of MR sensor 20 and the combination of the amount of reduction at the bottom of MR sensor 20 due to processing plus the amount MR sensor 20 is lapped during the lapping process, represented by $Y_{ABS}$. The following discussion, with reference to FIG. 5, solves for these two unknowns, $Y_{SHR}$ and $Y_{ABS}$, through use of triangles 50 and 52.

Reduction occurs isotopically on both triangle 50 and MR sensor 20. In the example shown in FIG. 5, the base angles of triangles 50 and 52 are isometric (i.e. the base angles are equal and represented by $\theta$). Therefore, $X_1 = X_2$. In addition, $Y_0$ represents the height of the tip of triangle 50 above plane 25 and represents the height of the tip of triangle 52 below plane 25.

$$Y = X\tan\theta - Y_0 + \frac{Y_{SHR}}{\cos\theta}. \quad (9)$$

Solving for X:

$$X = \frac{1}{\tan\theta} \left[ Y_{ABS} + Y_0 - \frac{Y_{SHR}}{\cos\theta} \right]. \quad (10)$$

Now solve for $X_A$ in terms of Y:

$$X_A = X_2 + X_1 = 2X = \frac{1}{\tan\theta} \left[ 2Y_{ABS} + 2Y_0 - \frac{2Y_{SHR}}{\cos\theta} \right]. \quad (11)$$

As shown in FIG. 5, triangle 52 is an inverted triangle with respect to triangle 50. Following a similar process for second triangle 52 yields:

$$X_B = 2X = \frac{1}{\tan\theta} \left[ -2Y_{ABS} + 2Y_0 - \frac{2Y_{SHR}}{\cos\theta} \right]. \quad (12)$$

Since $\theta$ is a known angle, we have two equations (Equations 11 and 12) and two unknowns ($Y_{ABS}$ and $Y_{SHR}$). Thus, we can solve for $Y_{SHR}$ and $Y_{ABS}$ through use of the following equations:

$$Y_{SHR} = [(X_A + X_B)\tan\theta - 4Y_0] \left( \frac{-\cos\theta}{4} \right) \quad (13)$$

and $$Y_{ABS} = (X_B - X_A) \frac{\tan\theta}{4}. \quad (14)$$

The final height $Y_{FIN}$ of MR sensor 20 can now be determined since $Y_{SHR}$, $Y_{BEG}$ and $Y_{ABS}$ are known quantities. See equation 8. The above process solves for the final height of MR sensor 20 through use of two triangles 50 and 52.

An alternative method of solving for the two unknown quantities, $Y_{ABS}$ and $Y_{SHR}$, includes the use of a single triangle, such as triangle 50 and a single rectangle, such as first rectangle 54, shown in FIGS. 2 and 3. Rectangle 54 provides the tool necessary to determine the change of the height of MR sensor 20. The width of rectangle 54 is known prior to processing and is measured after the lapping process. The change in width of first rectangle 54 is equal to the change in height of MR sensor 20 due to changes during processing. The unknown quantity $Y_{ABS}$ can be solved for as previously described through use of a single equation (Equation 11 or 12, based upon the triangle used).

The relationship of rectangles 54 and 56 is primarily a method to determine the amount of shrinkage of the MR sensor compared to the pre-wafer processing size of the MR sensor. This is done by using the pitch from the left edge of the first rectangle 54 to the left edge of the second rectangle 56 as a precise scale indicator. The scale is applied to the measurements of the post-lapping triangle width, and the rectangle widths.

The secondary purpose of second triangle 56 is to provide an indicator of the designed pre-wafer processing height of the MR sensor, compared to other designs which would use different design dimensions for purposes of various product performance specifications.

The present description discloses various systems and methods for verifying the height of a particular MR sensor after a lapping process has been completed. In one system and method, two triangles formed of MR material can be used. In an alternate system and method, one triangle and one rectangle can be utilized. In a second alternate system and method, a second rectangle can be used as a back-up verification. In a third combination, two triangles and two rectangles can be utilized. Other combinations are also possible.

The present description also discloses various systems and methods of verifying the throat height of an inductive transducer. The same system and method are followed, substituting an inductive transducer for the MR sensor and substituting proper circuitry in the auxiliary circuit.

The present description enables one to directly measure a sensor height of a sensor by simply measuring the lengths of two strips of triangles composed of MR material exposed at the air bearing surface. The structure of the design is such that a small variation in the center height will show a large change in the strip length and hence produce greater accuracy in measurement. The above process also includes structures that assist in calculating a change in the sensor dimensions associated with process variation, and hence is also a useful tool to measure the results of processing steps involved in building wafers.

Although the present disclosure has includes specific dimensions and angles, it is understood that various other dimensions and angles can be used in the present system and method.

Although the present invention has been described with reference to preferred embodiments, workers skilled in the art will recognize that changes may be made in form and detail without departing from the spirit and scope of the invention.

What is claimed is:

1. A method of determining a height of a magnetic sensor, the sensor formed from a magnetoresistive material and having an air bearing surface, the method comprising:

determining a pre-wafer processing width of a base of a first triangle at an air bearing surface, the first triangle formed of magnetoresistive material;

determining a pre-wafer processing width of a top of a second triangle at an air bearing surface, the second triangle formed of magnetoresistive material;

wafer processing the magnetic sensor, the first triangle and the second triangle;

simultaneously lapping the air bearing surface of the magnetoresistive sensor, the base of the first triangle and the top of the second triangle;

determining a post-lapping width of the base of the first triangle at the air bearing surface;

determining a post-lapping width of the top of the second triangle at the air bearing surface; and calculating the height of the magnetic sensor through use of the pre-wafer processing widths and the post-lapping widths at the air bearing surfaces of the base of the first triangle and the top of the second triangle.

2. The method of claim 1 wherein the step of calculating the height of the magnetic sensor further comprises:

calculating a change in the width of the base of the first triangle;

calculating a change in a height of the first triangle based upon the change in the width of the base of the first triangle and a predetermined angle of the first triangle;

calculating a change in the width of the base of the first triangle; and calculating a change in a height of the first triangle based upon the change in width of the base of the first triangle, a predetermined angle of the first triangle and the change in width of the first rectangle.

3. The method of claim 1 wherein the step of calculating the height of the magnetic sensor further comprises:

calculating an amount of change of the height of the magnetic sensor based upon the change in the width of the base of the first triangle and the change in the width of the top of the second triangle; and calculating a change in the height of the magnetic sensor of the air bearing surface based upon the change in the width of the base of the second triangle and the change in the width of the top of the second triangle.

4. The method of claim 3 wherein the step of calculating and the amount of change of the height of the magnetic sensor further comprises:

determining a pre-wafer processing width of a first rectangle;

determining a post-lapping width of the first rectangle;

determining a pre-wafer processing width of a second rectangle formed of magnetoresistive materials; and wherein the pre-wafer processing width of the first rectangle minus the post-lapping width of the first rectangle equals the amount of shrinkage of the height of the magnetic sensor.

5. The method of claim 4 wherein the step of calculating and the amount of change of the height of the magnetic sensor further comprises:

determining a pre-wafer processing width of a second rectangle;

determining a post-lapping width of the second rectangle;

determining a pre-wafer processing width of a second rectangle formed of magnetoresistive materials; and wherein the pre-wafer processing width of the second rectangle minus the post-lapping width of the second rectangle equals the amount of shrinkage of the height of the magnetic sensor.

6. A method of determining a height of a magnetic sensor, the sensor formed from a magnetoresistive material and having an air bearing surface, the method comprising:

determining a pre-wafer processing width of a base of a first triangle at an air bearing surface, the first triangle formed of magnetoresistive material;

determining a pre-wafer processing width of a first rectangle formed of magnetoresistive material;

wafer processing the magnetic sensor, the first triangle and the first rectangle;

simultaneously lapping the air bearing surface of the magnetoresistive sensor, the base of the first triangle and the first rectangle;

determining a post-lapping width of the base of the first triangle at the air bearing surface;

calculating the height of the magnetic sensor through use of the pre-wafer processing widths and the post-lapping widths at the air bearing surfaces of the base of the first triangle and the rectangle.

7. The method of claim 6 wherein the step of calculating the height of the magnetic sensor further comprises:

calculating a change in the width of the base of the first triangle;

calculating a change in a height of the first triangle based upon the change in the width of the base of the first triangle and a predetermined angle of the first triangle; and wherein the change in the height of the first triangle plus the change in the width of the first rectangle equals the change in the height of the magnetic sensor.

8. The method of claim 6 wherein the step of calculating the height of the magnetic sensor further comprises:

calculating an amount of change of the height of the magnetic sensor.

9. The method of claim 8 wherein the step of calculating the amount of change further comprises:

calculating a change in width of the first rectangle, wherein the change in width of the first rectangle represents the amount of change in the height of the magnetic sensor.

10. The method of claim 9 wherein the step of calculating the height of the magnetic sensor further comprises:

determining a pre-wafer processing width of a second rectangle formed of magnetoresistive materials;

determining a post-lapping width of the second rectangle; and wherein the post-lapping width of the second rectangle minus the pre-wafer processing width of the second rectangle equals the amount of change of the height of the magnetic sensor.

11. A method of determining a height of a magnetic sensor, the sensor formed from a magnetoresistive material and having an air bearing surface, the method comprising:

determining a pre-wafer processing width of a top of a first triangle at an air bearing surface, the first triangle formed of magnetoresistive material;

determining a pre-wafer processing width of a first rectangle formed of magnetoresistive material;

wafer processing the magnetic sensor, the first triangle, and the first rectangle;

simultaneously lapping the air bearing surface of the magnetoresistive sensor, the top of the first triangle and the first rectangle;

determining a post-lapping width of the top of the first triangle at the air bearing surface;

determining a post-lapping width of the first rectangle; and calculating the height of the magnetic sensor through use of the pre-wafer processing and post-lapping widths at the air bearing surfaces of the top of the first triangle and the rectangle.

12. The method of claim 10 wherein the step of calculating the height of the magnetic sensor further comprises:

calculating a change in the width of the top of the first triangle;

calculating a change in a height of the first triangle based upon the change in the width of the top of the first triangle and a predetermined angle of the first triangle; and wherein the change in the height of the first triangle plus the change in the width of the first rectangle equals the change in the height of the magnetic sensor.

13. The method of claim 10 wherein the step of calculating the height of the magnetic sensor further comprises:

calculating an amount of change of the height of the magnetic sensor.

14. The method of claim 13 wherein the step of calculating the amount of change further comprises:

calculating a change in width of the first rectangle, wherein the change in width of the first rectangle represents the amount of shrinkage in the height of the magnetic sensor.

15. The method of claim 13 wherein the step of calculating and the amount of change of the height of the magnetic sensor further comprises:

determining a pre-wafer processing width of a first rectangle;

determining a post-lapping width of the first rectangle;

determining a pre-wafer processing width of a second rectangle formed of magnetoresistive materials; and wherein the pre-wafer processing width of the first rectangle minus the post-lapping width of the first rectangle equals the amount of change of the height of the magnetic sensor.

16. The method of claim 13 wherein the step of calculating and the amount of change of the height of the magnetic sensor further comprises:

determining a pre-wafer processing width of a second rectangle;

determining a post-lapping width of the second rectangle;

determining a pre-wafer processing width of a second rectangle formed of magnetoresistive materials; and wherein the pre-wafer processing width of the second rectangle minus the post-lapping width of the second rectangle equals the amount of change of the height of the magnetic sensor.

17. A method for determining a location of an element within a device with respect to a known surface of the device, the method comprising:

determining a pre-processing width of a base of a first triangle at the known surface;

determining a pre-processing width of a top of a second triangle at the known surface;

determining a pre-processing width of a first rectangle;

determining a pre-processing width of a second rectangle;

processing the device, the first triangle, the second triangle, the first rectangle and the second rectangle;

simultaneously lapping the known surface of the sensor, the base of the first triangle, the top of the second triangle and the first and second rectangles;

determining a post-lapping width of the base of the first triangle at the known surface;

determining a post-lapping width of the top of the second triangle at the known surface;

determining a post-lapping width of the first rectangle;

determining a post-lapping width of the second rectangle; and calculating the location of the device through use of the preprocessing widths and the post-lapping widths at the known surface of the base of the first triangle, the top of the second triangle, the first rectangle and the second rectangle.

* * * * *